(No Model.) 4 Sheets—Sheet 1.

J. F. GUTHRIE, Jr.
THROW OUT.

No. 489,530. Patented Jan. 10, 1893.

Witnesses:
John R Snow
H. E. Renick Jr.

Inventor:
James F. Guthrie, Jr.
by his attorneys

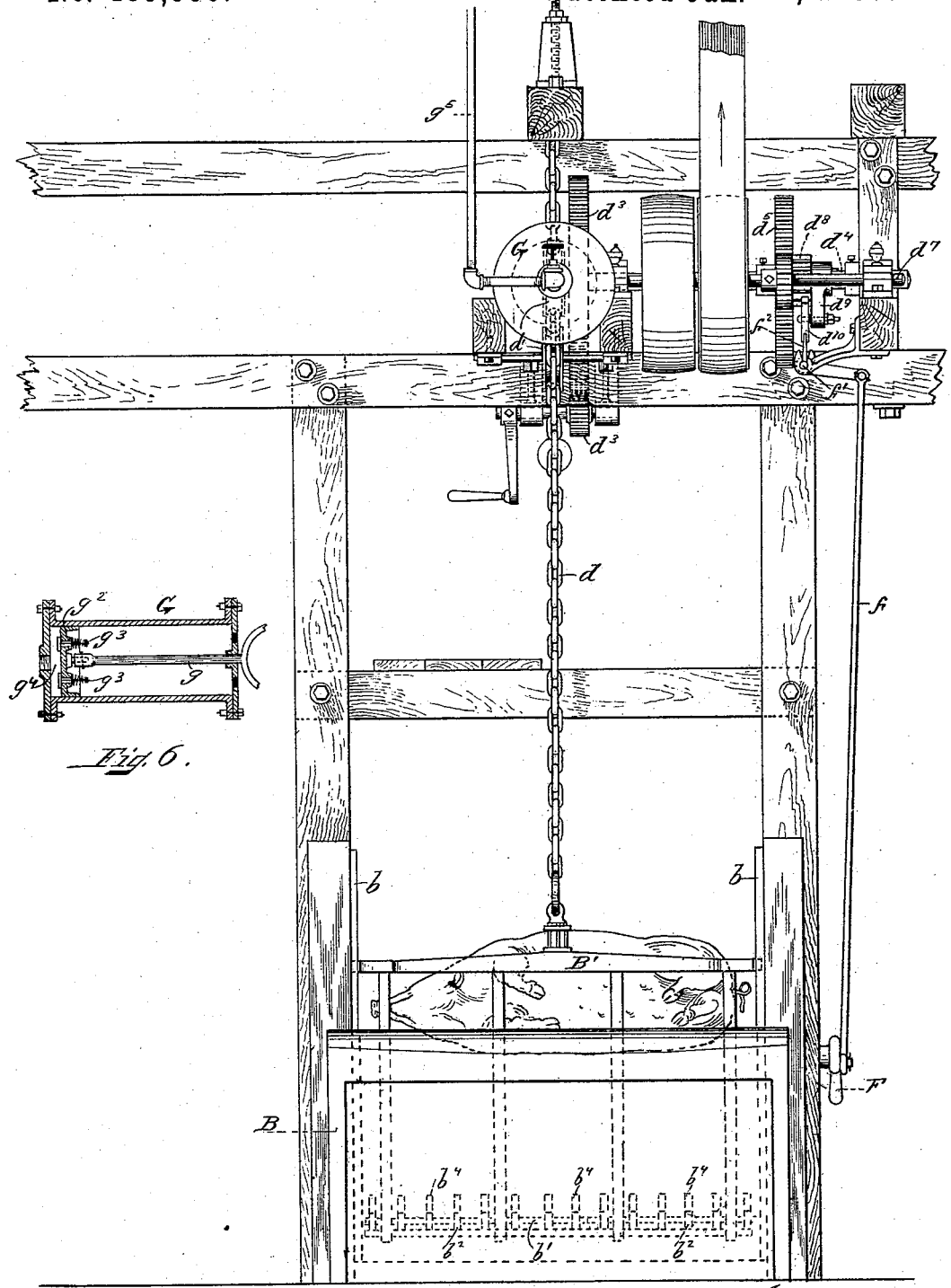

(No Model.) 4 Sheets—Sheet 3.

J. F. GUTHRIE, Jr.
THROW OUT.

No. 489,530. Patented Jan. 10, 1893.

Witnesses
John R. Snow
H. E. Remick Jr.

Inventor
James F. Guthrie Jr.
By his attorneys
Maynadier & Beach (No Model.)  4 Sheets—Sheet 4.

J. F. GUTHRIE, Jr.
THROW OUT.

No. 489,530. Patented Jan. 10, 1893.

UNITED STATES PATENT OFFICE.

JAMES F. GUTHRIE, JR., OF SOMERVILLE, MASSACHUSETTS, ASSIGNOR OF ONE-HALF TO CHARLES A. CUSHMAN, OF SAME PLACE.

THROW-OUT.

SPECIFICATION forming part of Letters Patent No. 489,530, dated January 10, 1893.

Application filed March 28, 1892. Serial No. 426,657. (No model.)

*To all whom it may concern:*

Be it known that I, JAMES F. GUTHRIE, Jr., of Somerville, in the county of Middlesex and State of Massachusetts, have invented a new and useful Throw-Out, of which the following is a specification, reference being had to the accompanying drawings, in which—

Figures 1, 5:
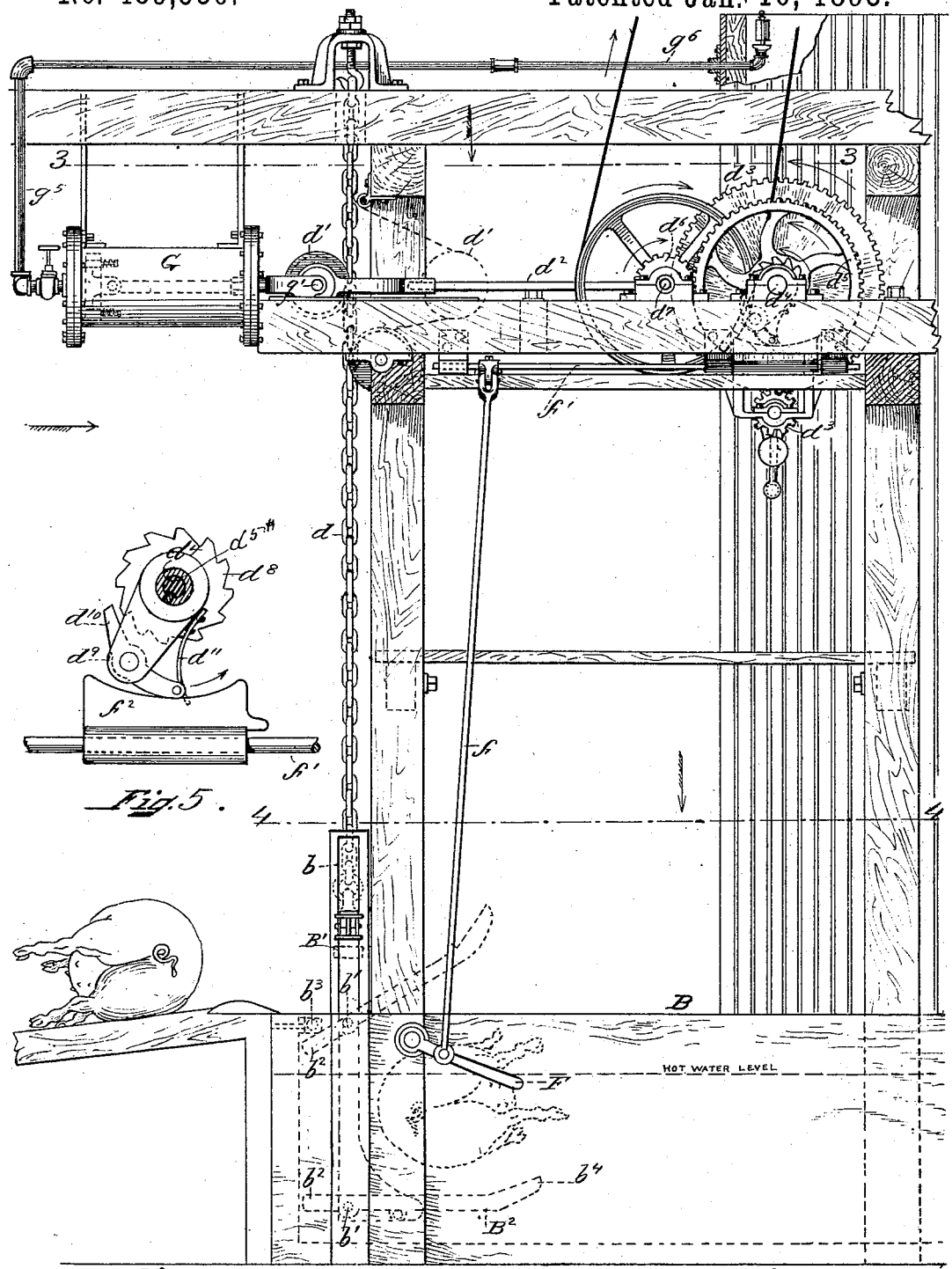
Figures 3, 4:
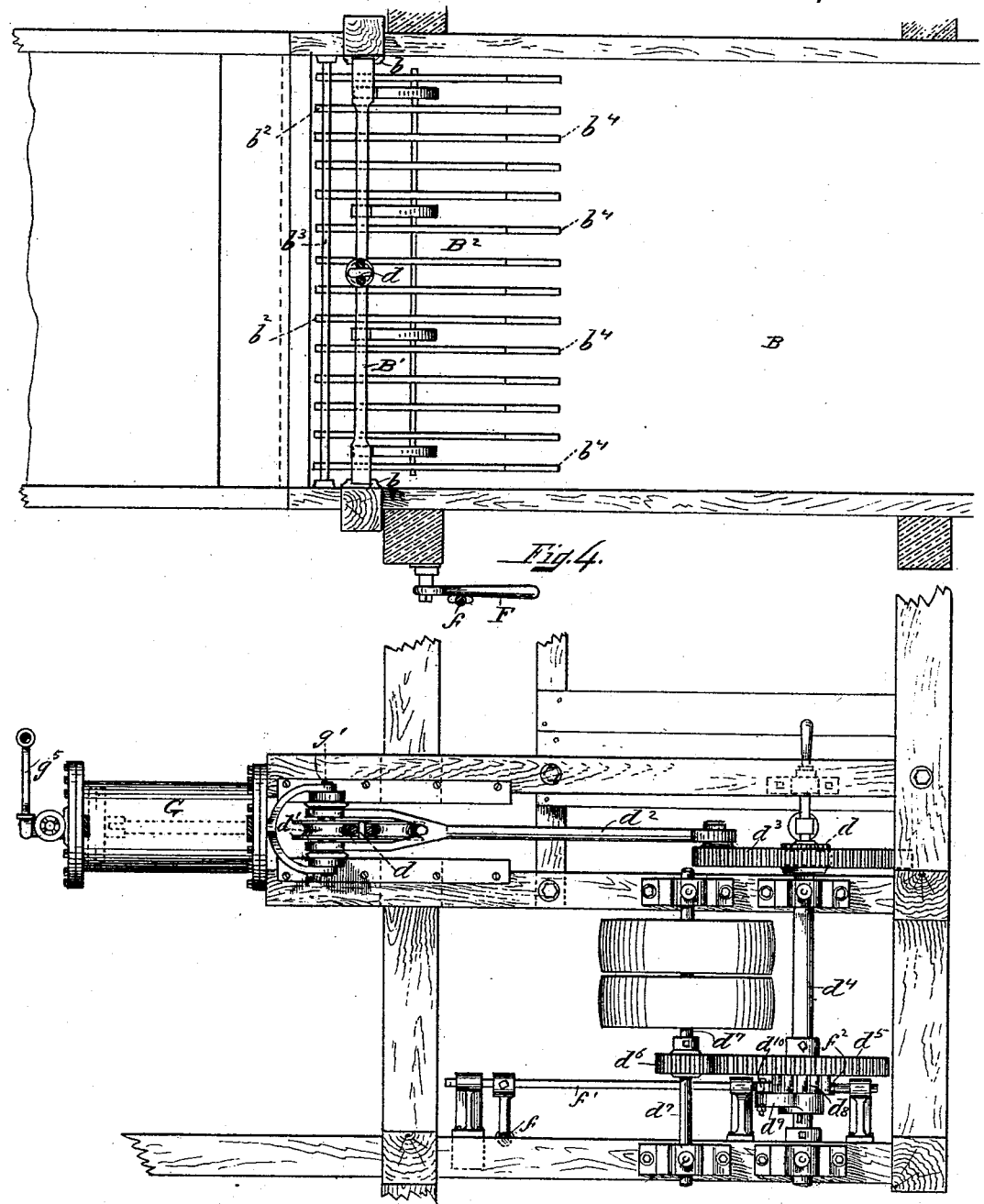
Figure 7:
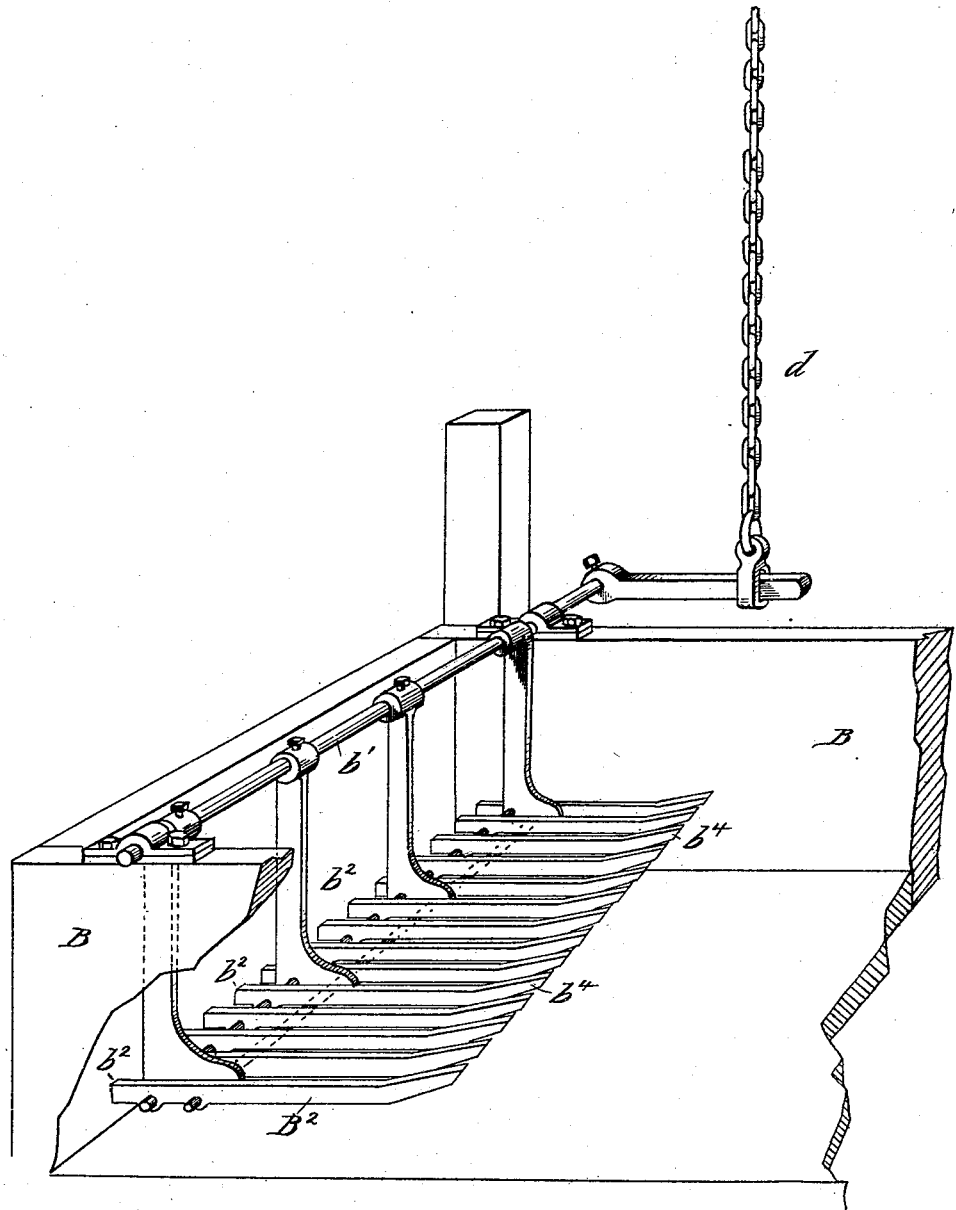

Figures 1 and 2 are side-elevations, and Fig. 3 a partial top plan of my new throw out; Fig. 4 is a plan view partly in section on line 4—4 of Fig. 1; Fig. 5 shows a detail of actuating mechanism; and Fig. 6 is a sectional view of a cylinder and piston forming part of the preferred form of actuating mechanism and also of signaling mechanism; Fig. 7 shows a modification.

In the drawings, showing the best embodiment of my invention now known to me, A represents, diagrammatically, the sticking pen from which the slaughtered animal is conveyed to the scalding tank B, which is provided with ways $b$ in which move a frame B' carrying the lifter B². The lifter is mounted on a support $b'$ to frame B' and has an extension $b^2$, which as the lifter moves to its highest position, engages a cross-bar $b^3$, whereby the lifter is arrested so that continued upward movement of the frame B' causes the lifter to turn on its support $b'$ and throw the animal from the scalding tank. The lifter B² preferably consists of a series of tines $b^4$ set edgewise to the water so that when the lifter is lowered it does not splash out the hot water from the scalding tank, and this form of lifter is a feature of my invention and is highly important as it minimizes the danger of scalding the operator.

The preferred form of mechanism for actuating the lifter is that shown, the lifter being suspended by a flexible support $d$ of sufficient length to permit the lifter approaching sufficiently near the bottom of the scalding tank to receive an animal floated upon it. By flexible support I mean a chain, rope, jointed rod, or any other suitable support the length of which is capable of being lengthened or shortened. A chain as shown, is a convenient form of flexible support for the lifter and its reach is conveniently lessened by the reciprocating take-up $d'$ carried by a crank rod $d^2$, which pulls the take-up $d'$ against the support $d$ and so actuates the lifter, as will be plain without further description. The crank rod $d^2$ is attached to a gear $d^3$ fast on shaft $d^4$ which is provided with a gear $d^5$ loose on a sleeve $d^5*$ fast on shaft $d^4$. Gear $d^5$ meshes with a gear $d^6$ on the driving-shaft $d^7$. Shaft $d^4$ is provided with a ratchet-wheel $d^8$ which is loose on sleeve $d^5*$ and is secured to gear $d^5$. An arm $d^9$ is splined to shaft $d^4$ and carries a pawl $d^{10}$ which is kept in engagement with the ratchet-wheel $d^8$ by a spring $d^{11}$ when the machine is in operation. This part of my throw-out will be best understood from a description of the operation thereof. When the parts are in the position shown in Fig. 1, the lifter B² is near the bottom of the scalding tank and ready to receive the animal. The operator moves the lever F upward. This lever is connected by a rod $f$ to a rocker-shaft $f'$ which carries a "butter-fly" $f^2$. When the machine is at rest, the butter-fly $f^2$ is in position to engage the tail of pawl $d^{10}$ as shown in Figs. 1 and 5. Moving the lever F, carries the butterfly $f^2$ out of the path of the pawl $d^{10}$ and the pawl engages the ratchet. Then the driving shaft $d^7$ being rotated, gear $d^6$ turns gear $d^5$, and the shaft $d^4$ is compelled to rotate because the ratchet-wheel $d^8$ is in engagement with the pawl on arm $d^9$ which is splined to shaft $d^4$. Consequently, gear $d^3$ is rotated and the crank rod $d^2$ draws the take-up $d'$ against the support $d$ and lifts the frame B' carrying the lifter B². After the lever F is moved to carry the butterfly out of engagement with the pawl, it falls back and the butterfly is moved into the path of the pawl. One revolution of shaft $d^4$ brings the pawl into engagement with the butterfly, the pawl is carried out of engagement with the ratchet wheel $d^8$, and the gears run free, the weight of the frame B' and lifter B² now pulls against the take-up $d'$ and as the gears are free to revolve they are rotated by the weight of the frame and lifter to allow the lifter to descend.

In practice, I employ a cylinder and piston G to prevent the frame B' from falling back with a jerk; and in this case, the crank-shaft $d^2$ is pinned to the piston-rod $g$ at $g'$. When the crank-shaft $d^2$ is moved to take-up support $d$, the piston head $g^2$ is moved toward the operating mechanism of the machine and the valves $g^3$ with which piston head $g^2$ is provided are opened to allow air to pass into the chamber $g^4$; and when the crank-shaft $d^2$ moves back and the frame B' and lifter $B^2$ are lowered, an air cushion is formed in chamber $g^4$, and the fall of the lifter is made without strain on the machine and without slamming, as will be plain to all skilled in the art. As the sticking pen is usually at some distance from the scalding room, it is desirable to automatically signal the stickers when the throw-out is ready for another animal; and I accomplish this by piping the chamber $g^4$ to the sticking-pen by a pipe $g^5$ which is provided with a whistle $g^6$. When the air is compressed in chamber $g^4$ on the back-stroke of the piston head $g^2$, the whistle is automatically sounded as will be clear to all skilled in the art without further description.

It is convenient to provide the machine with an auxiliary hand device for actuating the mechanism that operates the take-up $d'$, and I have shown such a device in the drawings but as it forms the subject of no claim and may be wholly omitted it is not herein described.

It will be plain that my machine as shown and above described may be varied in many details; and in Fig. 7, showing a modification, I have shown one important variation. In this form the lifter $B^2$ is not reciprocated; but is mounted on a shaft $b'$ which is provided with an arm to which the flexible support $d$ is connected.

It will be plain to all skilled mechanics that for the air-cushion in chamber $g^4$, a spring, or a counterbalance, or a friction device, might be used to gradually arrest the back-stroke of the take-up carrier.

What I claim is:

1. In combination a lifter; a flexible support a reciprocating take up for the support; a carrier for the take up; and means for gradually arresting the back stroke of the take up carrier substantially as described.

2. In combination a lifter, a flexible support for the lifter; a reciprocating take-up for the support; a cylinder; a piston; connections between the piston and take-up; inlet and outlet openings in the cylinder, and a whistle or other alarm device connected with the outlet openings; substantially as described.

3. In combination a scalding tank, B; frame B' mounted to reciprocate thereon; lifter $B^2$; and mechanism substantially such as described for reciprocating frame B' and for tilting lifter $B^2$; all combined and operating substantially as described.

JAMES F. GUTHRIE, JR.

Witnesses:
EDWARD S. BEACH,
JOHN R. SNOW.